US012726055B2

(12) United States Patent
Araki et al.

(10) Patent No.: US 12,726,055 B2
(45) Date of Patent: Sep. 1, 2026

(54) INSULATOR, STATOR, AND ROTATING ELECTRICAL MACHINE USING THESE

(71) Applicants: TOSHIBA INDUSTRIAL PRODUCTS AND SYSTEMS CORPORATION, Kanagawa (JP); KAWAMATA SEIKI CO., LTD., Fukushima (JP)

(72) Inventors: Takashi Araki, Mie (JP); Motoyasu Mochiduki, Mie (JP); Masaaki Matsumoto, Mie (JP); Ryou Tamura, Fukushima (JP); Hiroyasu Fukuhara, Fukushima (JP)

(73) Assignees: TOSHIBA INDUSTRIAL PRODUCTS AND SYSTEMS CORPORATION, Kanagawa (JP); KAWAMATA SEIKI CO., LTD., Fukushima (JP)

( * ) Notice: Subject to any disclaimer, the term of this patent is extended or adjusted under 35 U.S.C. 154(b) by 269 days.

(21) Appl. No.: 18/683,333

(22) PCT Filed: Aug. 19, 2022

(86) PCT No.: PCT/JP2022/031401
§ 371 (c)(1),
(2) Date: Feb. 13, 2024

(87) PCT Pub. No.: WO2023/026986
PCT Pub. Date: Mar. 2, 2023

(65) Prior Publication Data
US 2024/0348110 A1 Oct. 17, 2024

(30) Foreign Application Priority Data
Aug. 23, 2021 (JP) ................................ 2021-135556

(51) Int. Cl.
*H02K 1/14* (2006.01)
*H02K 3/34* (2006.01)

(52) U.S. Cl.
CPC ............ *H02K 1/148* (2013.01); *H02K 3/345* (2013.01); *H02K 2213/09* (2013.01)

(58) Field of Classification Search
CPC .......... H02K 5/225; H02K 3/38; H02K 3/522; H02K 2203/09; H02K 2203/12;
(Continued)

(56) References Cited

U.S. PATENT DOCUMENTS 12,374,952 B2 * 7/2025 Araki .................... H02K 3/522
2008/0157610 A1 7/2008 Watanabe et al.
(Continued)

FOREIGN PATENT DOCUMENTS

JP S5472402 A 6/1979
JP 2009303437 A 12/2009
(Continued)

OTHER PUBLICATIONS

Extended European Search Report dated May 23, 2025, for European Patent Application No. 22861274.3.
International Search Report dated Nov. 1, 2022, for International Patent Application No. PCT/JP2022/031401.

*Primary Examiner* — Leda T Pham
(74) *Attorney, Agent, or Firm* — KARCESKI IP LAW, PLLC

(57) ABSTRACT

A stator includes a plurality of composing split cores, an insulator that is attached to each of the split cores, a coil conductor wire that has a wound portion wound around the split cores via the insulator and a bridging portion drawn out from the wound portion, and a regulating member that regulates movement of the coil conductor wire. The insulator has an accommodating portion that accommodates the bridging portion, the accommodating portion has a first
(Continued)

surface and a second surface that form mutually facing surfaces and opening portions that communicate with each other and are formed in each of the first surface and the second surface. The regulating member is configured of a bendable member and is inserted through the opening portion formed in the first surface and the opening portion formed in the second surface and is wound around the bridging portion accommodated in the accommodating portion.

7 Claims, 13 Drawing Sheets

(58) Field of Classification Search
CPC ............ H02K 3/345; H02K 1/16; H02K 3/28; H02K 3/325; H02K 21/16
See application file for complete search history.

(56) References Cited

U.S. PATENT DOCUMENTS

| | | | | |
|---|---|---|---|---|
| 2012/0267979 | A1* | 10/2012 | Yoshida | H02K 3/522 310/214 |
| 2016/0072351 | A1* | 3/2016 | Mizoue | H02K 3/522 310/71 |
| 2019/0356190 | A1* | 11/2019 | Kitta | H02K 1/148 |
| 2021/0006118 | A1 | 1/2021 | Echizen et al. | |

FOREIGN PATENT DOCUMENTS

| | | | |
|---|---|---|---|
| JP | 5666976 | B2 | 12/2014 |
| JP | 2017163720 | A | 9/2017 |
| WO | 2010103871 | A1 | 9/2010 |
| WO | 2013177274 | A2 | 11/2013 |

* cited by examiner

INSULATOR, STATOR, AND ROTATING ELECTRICAL MACHINE USING THESE

CROSS-REFERENCE TO RELATED APPLICATION(S)

This is a National Stage Entry into the United States Patent and Trademark Office from International Patent Application No. PCT/JP2022/031401, filed on Aug. 19, 2022, which relies on and claims priority to Japanese Patent Application No. 2021-135556, filed on Aug. 23, 2021, the entire contents of both of which are incorporated herein by reference.

FIELD OF THE INVENTION

The present embodiments of the present invention relate to an insulator, a stator, and a rotating electrical machine using these.

BACKGROUND OF THE INVENTION

There is a rotating electrical machine including a stator and a rotor. The stator includes, for example, a stator core with an annular shape, a plurality of teeth projecting inward in a radial direction from an inner circumferential surface of the stator core, a coil conductor wire wound around the teeth, and an insulator that is attached to the teeth and secures insulation between the teeth and the coil conductor wire.

The rotor includes, for example, a rotor core with substantially a columnar shape disposed to be rotatable inside the stator in the radial direction and a magnet provided at the rotor core. Once a current is supplied to the coil conductor wire, an interlinkage magnetic flux is generated at each of the teeth. A magnetic attracting force and repulsion force occurs between the interlinkage magnetic flux and the magnet of the rotor, and the rotor thus rotates.

Also, as a rotating electrical machine of this type, a rotating electrical machine in which a stator core is configured of a plurality of split cores to facilitate a coil conductor wire winding operation and thereby to raise a space factor is known. The split cores used in the rotating electrical machine have back yoke portions with substantially arc shapes that form an annular-shaped portion of the stator core in a mutually assembled state and teeth projecting inward in the radial direction from the back yoke portions. A plurality of winding wire blocks having the split cores are disposed in an annular shape by a ring member with an annular shape thereby to compose the stator.

An insulator configured of an insulating material is attached to each split core. The insulator has a tooth covering portion that is attached to a tooth with the coil conductor wire wound around the outer periphery thereof, and a bridging portion accommodating portion that accommodates the coil conductor wire drawn out from the tooth covering portion and the coil conductor wire drawn out from another split core and guides the coil conductor wire to a terminal connecting portion. The bridging portion accommodating portion is integrally formed with substantially an arc shape outside the tooth covering portion in the core radial direction. In the bridging portion accommodating portion, guide groove portions that guide, along a circumferential direction of the stator core, a bridging portion of the coil conductor wire drawn out from the tooth covering portion and a bridging portion of the coil conductor wire drawn out from another split core are formed. The guide groove portions are formed in a plurality of stages to be separated from each other in the core radial direction for each phase in correspondence with a plurality of phases such as a U phase, a V phase, and a W phase, for example.

SUMMARY OF THE INVENTION

The aforementioned conventional rotating electrical machine has a structure in which the bridging portion of the coil conductor wire drawn outward in the core radial direction from the tooth covering portion is simply bent to follow the corresponding guide groove portion of the bridging portion accommodating portion. Therefore, the bridging portion of the coil conductor wire drawn outward in the core radial direction from the tooth covering portion, the bridging portion of the coil conductor wire drawn out from another split core, and the like may fall off from the guide groove portion when the plurality of split coils are assembled while the coils are routed around the bridging portions of the coils at the time of assembly of the stator. In this case, there is a concern that the coil conductor wire may be out of a predetermined position and short-circuiting or the like may occur.

Thus, an insulator, a stator, and a rotating electrical machine that enable a coil conductor wire to be appropriately fixed by a simple method are provided.

A stator according to the present embodiment includes: a plurality of winding wire blocks that are disposed in an annular shape; a plurality of split cores that compose a part of the plurality of winding wire blocks and are combined with each other to compose a stator core with an annular shape; an insulator that composes a part of the plurality of winding wire blocks and is attached to each of the plurality of split cores; a coil conductor wire that composes a part of the plurality of winding wire blocks and has a wound portion wound around the split cores via the insulator and a bridging portion drawn out from the wound portion; and a regulating member that regulates movement of the coil conductor wire. The insulator has an accommodating portion that accommodates the bridging portion, the accommodating portion includes a first surface and a second surface that form mutually facing surfaces, and opening portions that communicate with each other and are formed in each of the first surface and the second surface. The regulating member is configured of a bendable member and is configured to be fixable in a state where the regulating member is inserted through the opening portion in the first surface and the opening portion in the second surface and is wound around the bridging portion accommodated in the accommodating portion.

An insulator according to the present embodiment includes: an accommodating portion that accommodates a bridging portion of a coil conductor wire. The accommodating portion has a first surface and a second surface that form mutually facing surfaces, a plurality of groove portions that are provided between the first surface and the second surface, are depressed in a same direction, and accommodate the bridging portion in a separated manner for each phase, and opening portions that communicate with each other and are formed to face the first surface and the second surface, respectively.

A rotating electrical machine according to the present embodiment includes: the stator or a stator having the insulator; and a rotor.

DESCRIPTION OF EMBODIMENT(S) OF THE INVENTION

Hereinafter, a plurality of embodiments will be described with reference to the drawings Note that the same configurations in each embodiment will be denoted by the same reference signs and description will be omitted.

First Embodiment

Figure 1:
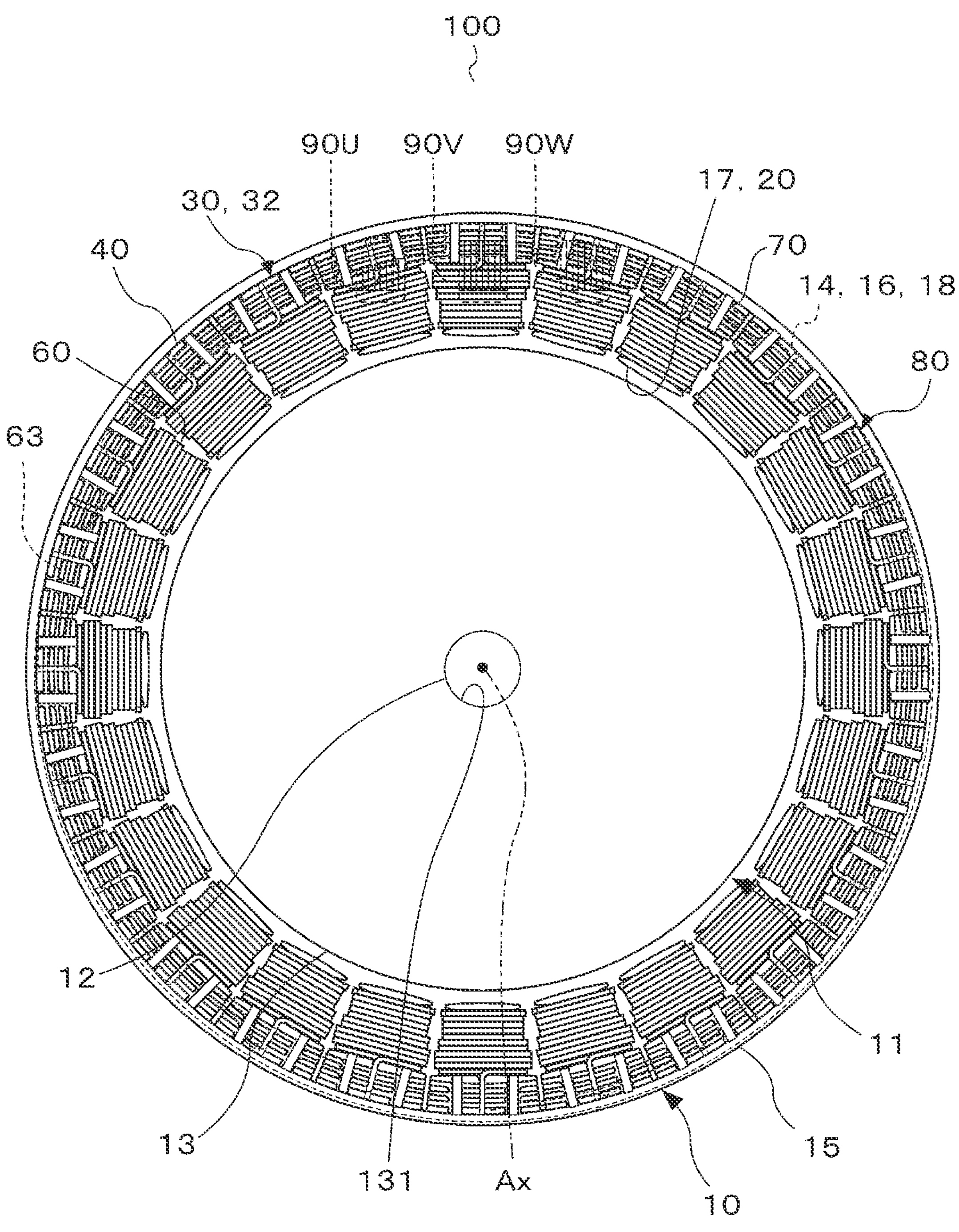
FIG. 1 is a schematic view of an example rotating electrical machine according to a first embodiment seen from one side in an axial direction with a stator case detached therefrom.
Figure 2:
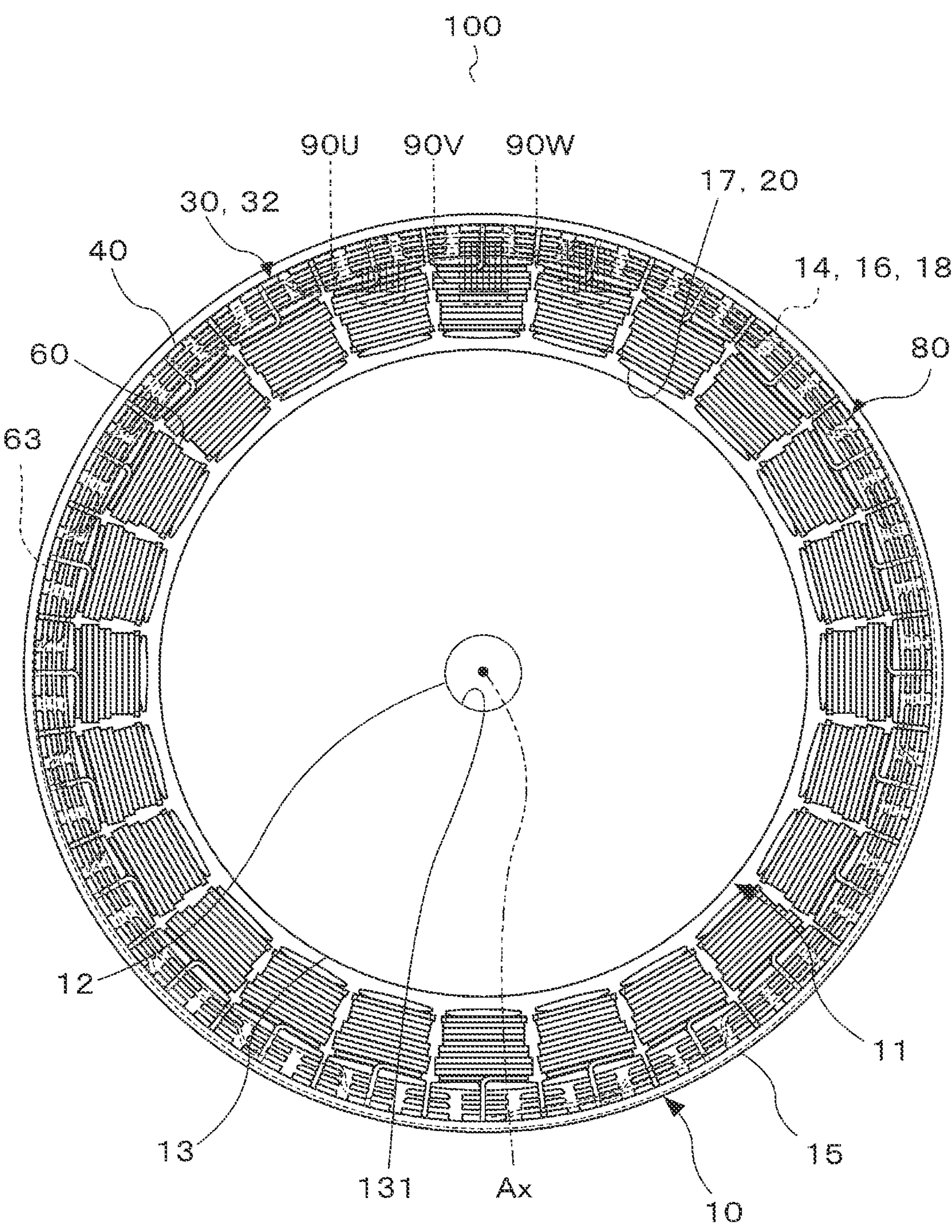
FIG. 2 is a schematic view illustrating the example rotating electrical machine according to the first embodiment illustrated in FIG. 1 in a state where a regulating member is detached therefrom.

First, a first embodiment will be described with reference to FIGS. 1 to 13. As illustrated in FIG. 1, a rotating electrical machine 100 includes a stator 10, a rotor 11, and a stator case, which is not illustrated. FIG. 1 is a view of the rotating electrical machine 100 seen from one side in an axial direction in a state where the stator case is detached therefrom. In the following description, a direction that is parallel with a rotation axis Ax of the rotor 11 which is an orientation perpendicularly intersecting the paper surface of FIG. 1 will be referred to as an axial direction, a rotation direction of the rotor 11 will be referred to as a circumferential direction, and a radial direction of the rotor 11 perpendicularly intersecting the axial direction and the rotation direction will be referred to as a radial direction. In the drawings, the axial direction will be described as A, the circumferential direction will be described as C, and the radial direction will be described as R. Note that a core axial direction that is an axial direction of a stator core 14, which will be described later, coincides with a direction in which the rotation axis Ax of the rotor 11 extends. A core circumferential direction that is a circumferential direction of the stator core 14 coincides with the rotation direction, that is, a circumferential direction of the rotor 11. A core radial direction that is a radial direction of the stator core 14 coincides with the radial direction of the rotor 11.

The stator 10 is formed in substantially a cylindrical shape and is fitted into and fixed to an inner circumferential surface of the stator case. The rotor 11 is disposed on the inner side in the radial direction of the stator 10 and is provided to be rotatable relative to the stator 10. The stator case, which is not illustrated, is formed in substantially a cylindrical shape and accommodates the stator 10 therein. The axial direction of the stator 10 and the stator case coincides with the rotation axis Ax.

The rotor 11 has a shaft 12, a rotor core 13, and a magnet, which is not illustrated. The shaft 12 is formed in a columnar shape and rotates about the rotation axis Ax. The rotor core 13 is fixed to the shaft 12 and includes a through-hole 131 formed at the center thereof in the radial direction to penetrate through the rotor core 13 in the axial direction. The shaft 12 is fixed to the through-hole 131 through press-fitting, for example. A plurality of magnets, which are not illustrated, are attached to be aligned in the circumferential direction near an outer circumferential portion of the rotor core 13.

The stator 10 has the stator core 14, a ring member 15, an insulator 30, a coil conductor wire 60, and a regulating member 70. The stator core 14 is a magnetic member, is formed in a cylindrical shape as a whole, and is configured to be splittable into a plurality of pieces. The stator core 14 is configured to include a plurality of, in this case, twenty four split cores 16. A single stator core 14 with a cylindrical shape as a whole is formed by the plurality of split cores 16 being press-fitted into the ring member 15 with an annular shape and being assembled with each other. Note that the axial direction of the ring member 15 coincides with the rotation axis Ax.

The insulator 30 is formed of an insulating member and is attached to the stator core 14. In this case, the insulator 30 covers at least a part of each split core 16. The coil conductor wire 60 is wound around the stator core 14. In the present embodiment, the coil conductor wire 60 is wound around the stator core 14 by a concentrated winding scheme. Also, the coil conductor wire 60 is wound around each split core 16 from above the insulator 30. The regulating member 70 is a bendable insulating member and is formed in a strip shape or a string shape with a long axis. The regulating member 70 has a function of regulating movement of a bridging portion 63, which will be described later, by surrounding a part of the coil conductor wire 60, specifically, the bridging portion 63 and fixing the part to the insulator 30.

The coil conductor wire 60 has a wound portion 61 wound around each split core 16 and bridging portions 62 and 63 drawn out from both sides of the wound portion 61 to the outer side. The first bridging portion 62 is a part of the coil conductor wire 60 drawn out from a winding start side. The second bridging portion 63 is a part of the coil conductor wire 60 drawn out from a winding termination side. Although the coil conductor wire 60 is a so-called flat wire with a rectangular sectional shape in the present embodiment, the coil conductor wire 60 is not limited thereto. In other embodiments, the coil conductor wire 60 may be a so-called round wire with a circular sectional shape.

The split cores 16 have a configuration in which a plurality of metal plates are laminated, for example. The split cores 16 may be formed by pressure-molding soft magnetic powder of a silicon steel plate or the like. In the present embodiment, eight split cores 16 in total disposed every three split cores 16, that is, with two split cores 16 interposed therebetween from among twenty four split cores 16 are split cores 16 in a U phase. Eight split cores 16 in total disposed every three split cores 16 to be adjacent to the split cores 16 in the U phase are split cores 16 in a V phase. Eight split cores 16 in total disposed every three split cores 16 to be adjacent to the split cores 16 in the U phase and the split cores 16 in the V phase are split cores 16 in a W phase.

Figure 3:
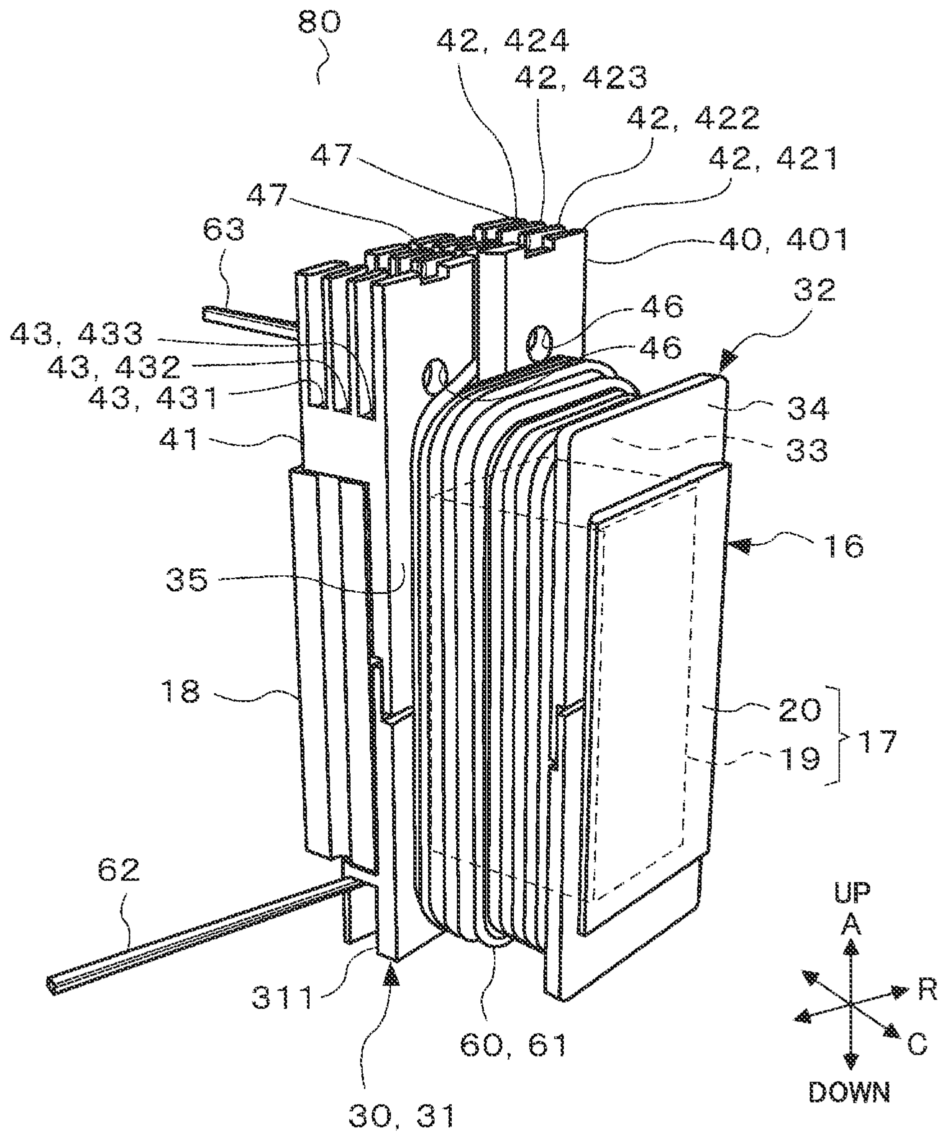
FIG. 3 is a perspective view of an example winding wire block of the rotating electrical machine according to the first embodiment seen from an inner side in a radial direction.

A winding wire block 80 is configured by winding the coil conductor wire 60 around each split core 16 via the insulator 30. FIG. 3 is a perspective view of the winding wire block 80. The winding wire block 80 is configured to include the split core 16, the insulator 30, and the coil conductor wire 60. The split core 16 is formed in substantially a T shape in a view in the axial direction. The split core 16 has a tooth 17 and a back yoke portion 18. The tooth 17 is formed to project inward in the radial direction from the back yoke portion 18. At least a part of the tooth 17 is covered with the insulator 30. In other words, the insulator 30 is attached to each split core 16 to cover the surroundings of the tooth 17. The coil conductor wire 60 is wound around each tooth 17 from above the insulator 30. The back yoke portion 18 forms a surface extending in the circumferential direction and the axial direction at the outer circumferential portion of the split core 16. The back yoke portion 18 is a place forming a magnetic path with an annular shape of the stator core 14 when the split cores 16 are disposed in the annular shape by the ring member 15. The back yoke portion 18 is formed such that an outer circumferential portion of the sectional shape perpendicularly intersecting the axial direction has an arc shape. Therefore, the stator core 14 has a shape in which the plurality of teeth 17 project inward in the radial direction from the back yoke portions 18 continuing in the annular shape in a view in the axial direction.

The tooth 17 has a tooth main body 19 and a flange portion 20. The tooth main body 19 is a part extending in the radial direction and receiving winding of the coil conductor wire 60 via the insulator 30. The flange portion 20 is connected to an inner end portion of the tooth main body 19 in the radial direction and forms a surface projecting in the axial direction and the circumferential direction from the tooth main body 19. The tooth main body 19 and the flange portion 20 are integrally molded. The tooth main body 19, the flange portion 20, and the back yoke portion 18 surround a slot that is a space where the wound portion 61 of the coil conductor wire 60 is wound.

The insulator 30 is configured to include a plurality of, in this case, two split members in the axial direction. In this case, the insulator 30 has a first insulator 31 and a second insulator 32. The first insulator 31 is attached to the split core 16 from one side of the tooth 17 in the axial direction. The second insulator 32 is attached to the split core 16 from the other side of the tooth 17 in the axial direction. In this case, the first insulator 31 is attached to the split core 16 from above the tooth 17 illustrated in FIG. 3, for example, and the second insulator 32 is attached to the split core 16 from below the tooth illustrated in FIG. 3, for example. Once the insulator 30 is attached to the split core 16, the first insulator 31 and the second insulator 32 are engaged with no gap therebetween, and the tooth 17 is not exposed to the outside from between the first insulator 31 and the second insulator 32 in this configuration. Winding of the coil conductor wire 60 that is wound around the tooth 17 from above the insulator 30 is started from the side of the first insulator 31, and a winding termination end is drawn out from the side of the second insulator 32. Note that although the side of the first insulator 31 in the axial direction may be referred to as a lower side and the side of the second insulator 32 may be referred to as an upper side in the following description, these are for convenience of explanation, and the lower side and the upper side may not coincide with the actual up-down direction.

Figure 4:
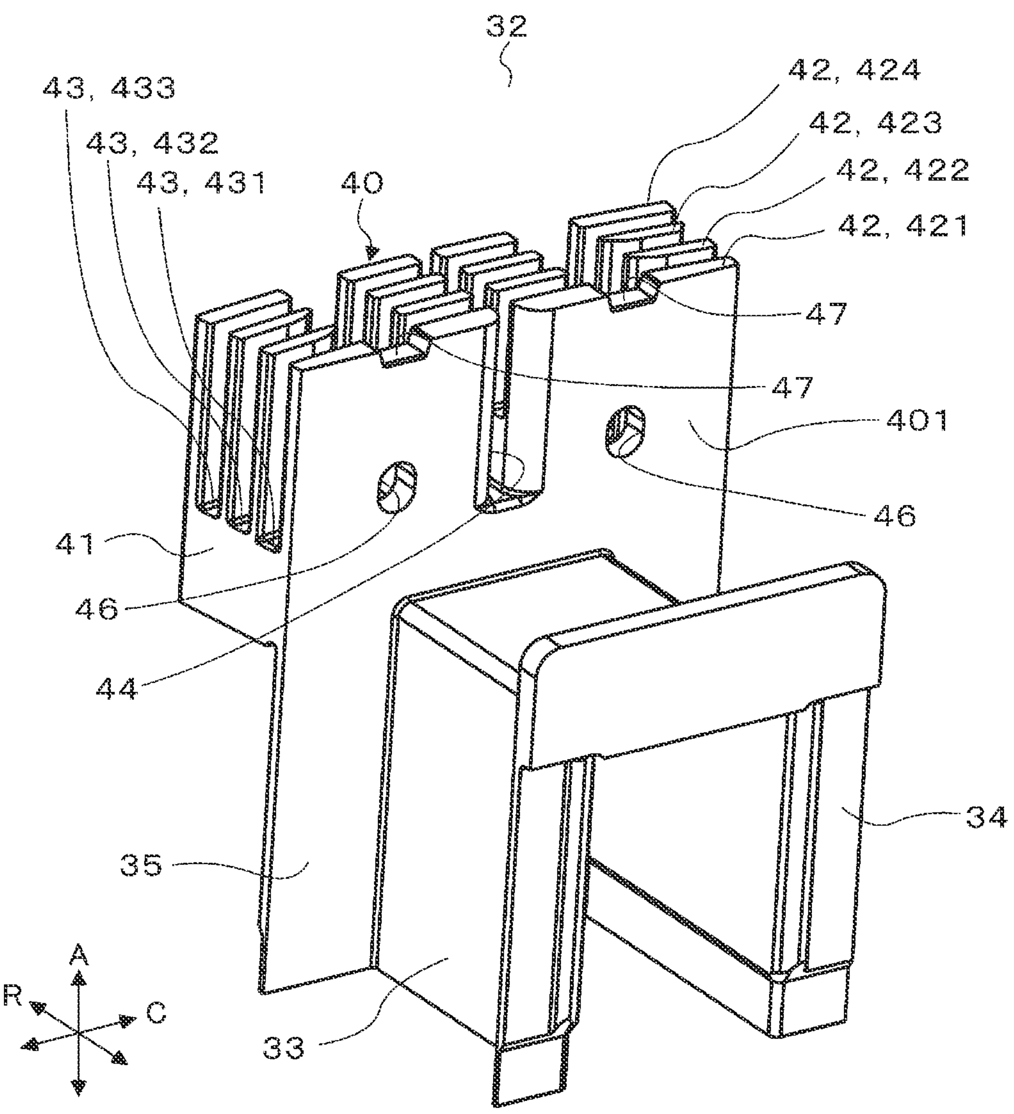
FIG. 4 is a perspective view of an example second insulator of the rotating electrical machine according to the first embodiment seen from the inner side in the radial direction.
Figure 5:
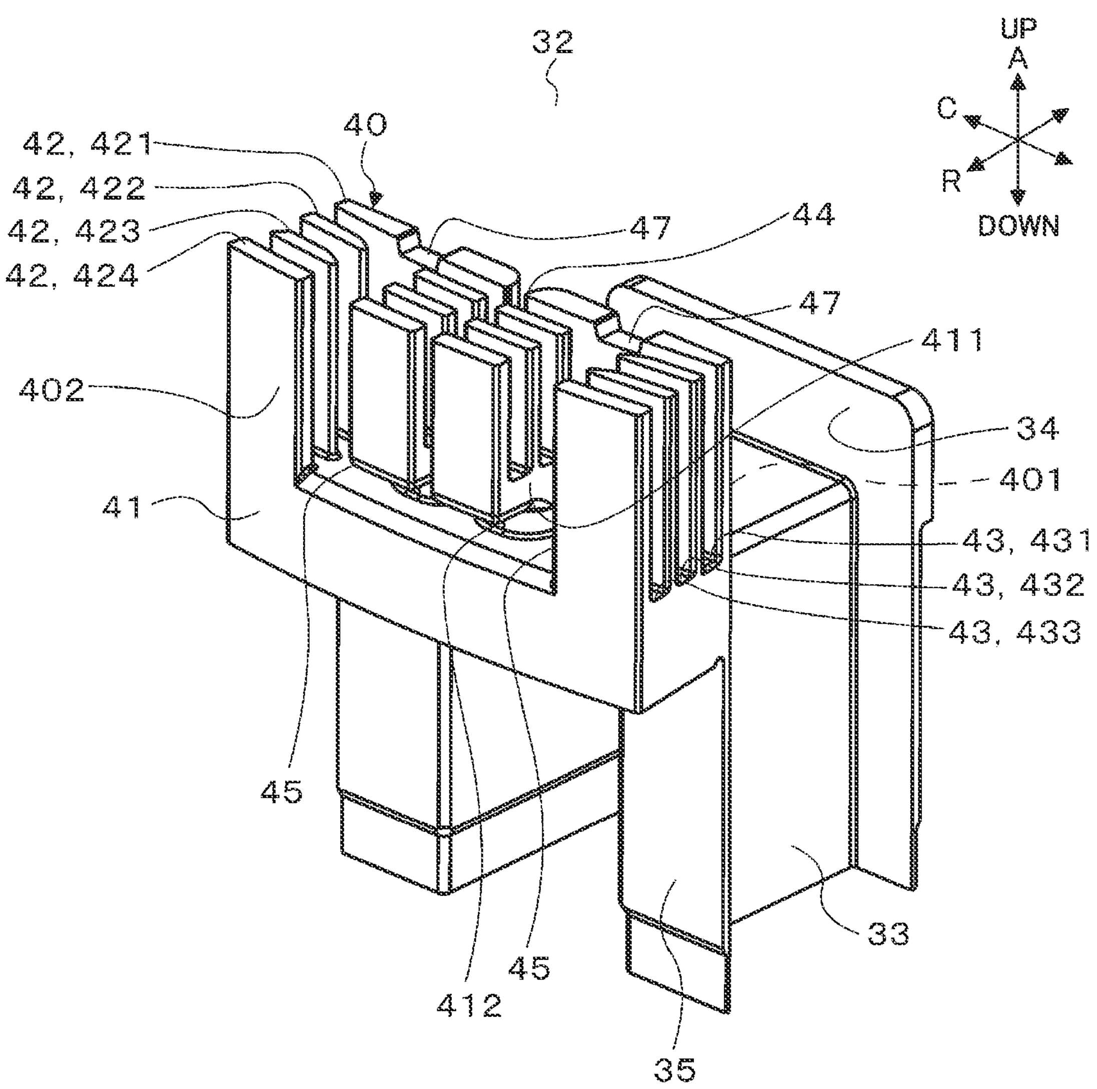
FIG. 5 is a perspective view of the example second insulator of the rotating electrical machine according to the first embodiment seen from an outer side in the radial direction.
Figure 6:
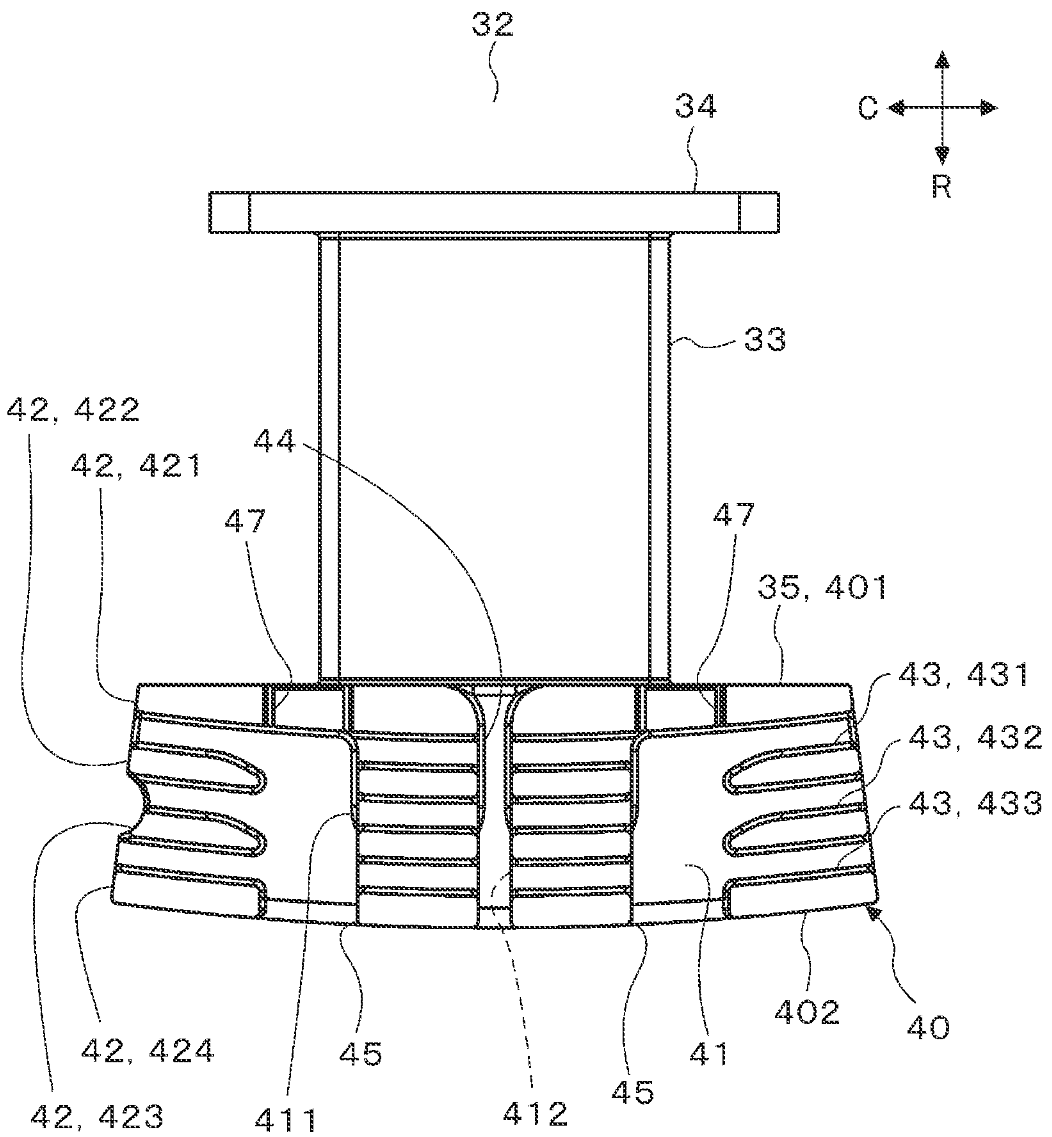
FIG. 6 is a view of the example second insulator of the rotating electrical machine according to the first embodiment seen from one side in the axial direction.
Figure 7:
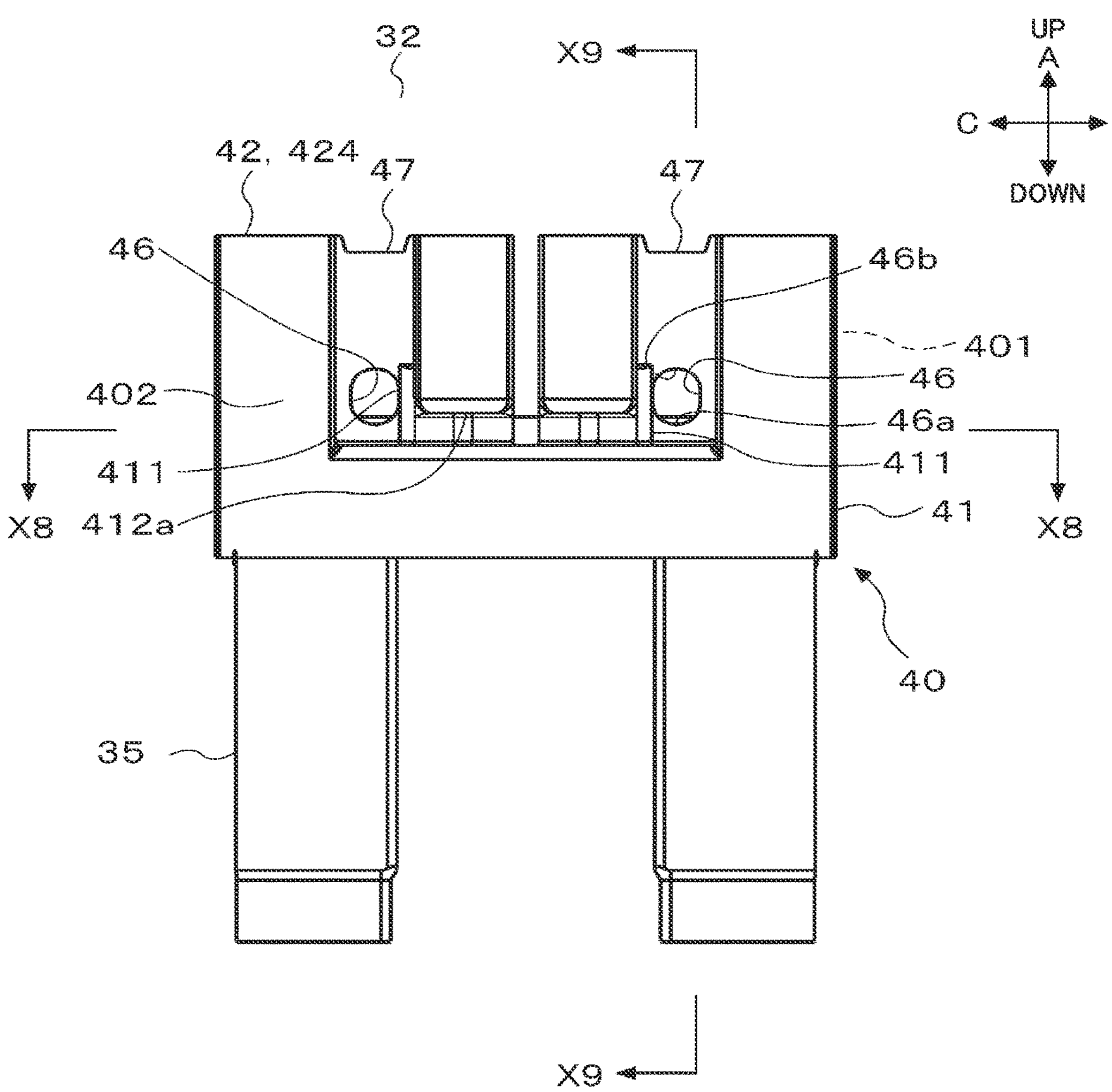
FIG. 7 is a view of the example second insulator of the rotating electrical machine according to the first embodiment seen from the outer side in the radial direction.
Figure 8:
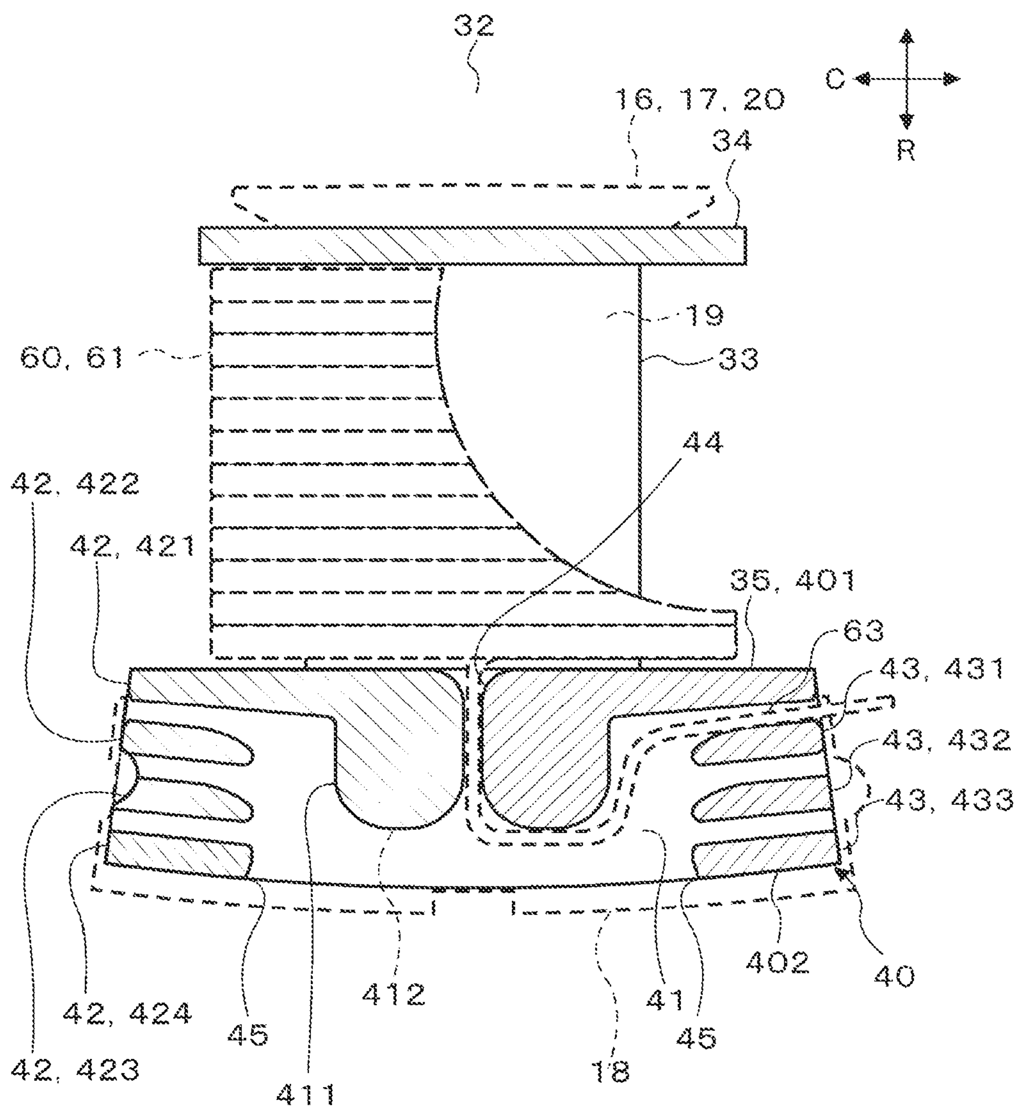
FIG. 8 is a sectional view of the example second insulator of the rotating electrical machine according to the first embodiment seen along the line X8-X8 in FIG. 7.
Figure 9:
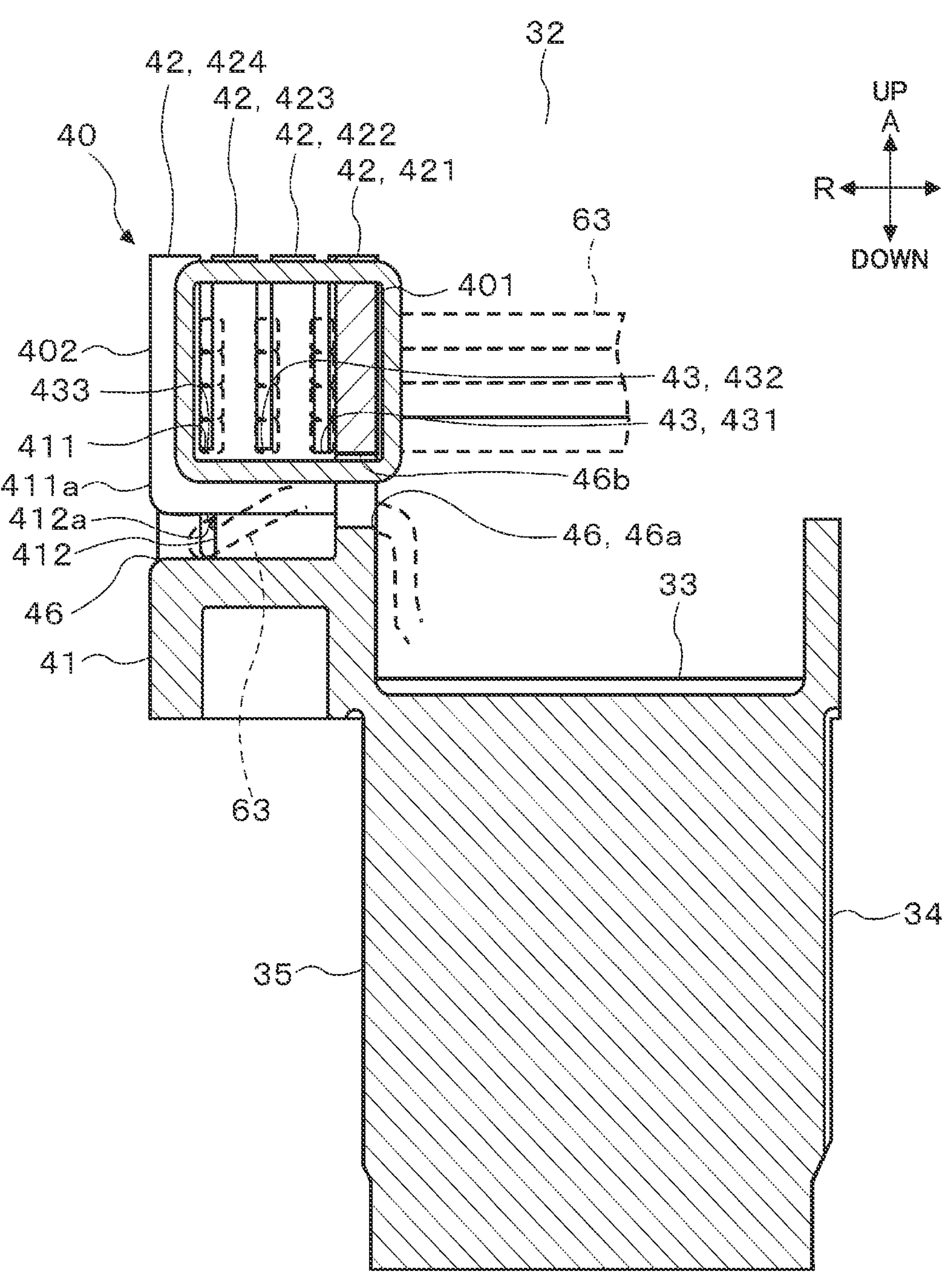
FIG. 9 is a sectional view of the example second insulator of the rotating electrical machine according to the first embodiment seen along the line X9-X9 in FIG. 7.

FIGS. 4 and 5 are perspective view of the second insulator 32 seen from the inner side in the radial direction and the outer side in the radial direction. FIG. 6 is a view of the second insulator 32 seen from a side away from the first insulator 31 in regard to the axial direction. FIG. 7 is a view of the second insulator 32 seen from the outer side in the radial direction. FIG. 8 is a sectional view of the second insulator 32 seen from the axial direction along the line X8-X8 in FIG. 7. In FIG. 8, the split core 16 and the coil conductor wire 60 are partially illustrated by dashed lines. FIG. 9 is a sectional view of the second insulator 32 seen from one side in the circumferential direction along the line X9-X9 in FIG. 7. The second insulator 32 has a covering portion 33, an inner wall portion 34, an outer wall portion 35, and an accommodating portion 40. The covering portion 33 is formed to have a U-shaped sectional shape in the axial direction and covers the tooth main body 19 from one side in the axial direction and both sides in the circumferential direction. The inner wall portion 34 and the outer wall portion 35 are molded integrally with an inner end portion and an outer end portion of the covering portion 33 in the radial direction and form surfaces extending in the axial direction and the circumferential direction. The inner wall portion 34 covers the flange portion 20 on the outer circumferential side. The outer wall portion 35 covers the back yoke portion 18 on the inner circumferential side.

The accommodating portion 40 is formed integrally with the outer wall portion 35. The accommodating portion 40 is provided to expand outward in the radial direction from the outer wall portion 35 and project in the axial direction. In this case, the accommodating portion 40 is provided to project in an orientation away from an end portion of connection to the first insulator 31 in regard to the axial direction, that is, on the side opposite to the first insulator 31. The accommodating portion 40 accommodates the second bridging portion 63 of the coil conductor wire 60 drawn out from the side of the covering portion 33 to the outer side in the radial direction and the second bridging portion 63 of the coil conductor wire 60 drawn out from another split core 16. The accommodating portion 40 is formed in an arc shape such that the outer circumferential portion follows the shape of the outer circumferential portion of the back yoke portion 18 in a view in the axial direction.

The accommodating portion 40 has a base portion 41, a plurality of guide walls 42, a plurality of guide groove portions 43, a drawing-out groove portion 44, and a routing passage 45. The base portion 41 is formed in substantially a fan shape in a view in the axial direction. The plurality of guide walls 42 are provided to project from the base portion 41. In this case, the plurality of guide walls 42 extend in an orientation away from the end portion connected to the first insulator 31 in regard to the axial direction, that is, on the side opposite to the first insulator 31 from the base portion 41. Also, each of the plurality of guide walls 42 forms a surface that is substantially perpendicular to the radial direction. The guide walls 42 function as a guide that guides the second bridging portions 63 along the guide walls 42.

The plurality of, in this case, four guide walls 42 are aligned at equal intervals and are aligned in the order of a first guide wall 421, a second guide wall 422, a third guide wall 423, and a fourth guide wall 424 from the inner side to the outer side in the radial direction. The surface of the first guide wall 421 on the inner side in the radial direction forms a first surface 401 which is a surface of the accommodating portion 40 on the inner side in the radial direction, that is, on the side of the tooth 17. The surface of the fourth guide wall 424 on the outer side in the radial direction forms a second surface 402 which is a surface of the accommodating portion 40 on the outer side in the radial direction, that is, on the side of the back yoke portion 18. The second guide wall 422 and the third guide wall 423 are provided between the first guide wall 421 on the inner side in the radial direction and the fourth guide wall 424 on the outer side in the radial direction.

The plurality of guide groove portions 43 are provided between the first surface 401 and the second surface 402. The plurality of guide groove portions 43 extend in the circumferential direction and accommodate the second bridging portions 63 in a separated manner in the radial direction for each phase. Each guide groove portion 43 is formed between the adjacent guide walls 42. The guide groove portions 43 function as passages through which the second bridging portions 63 pass. The drawing-out groove portion 44 is formed by cutting off a center portion of each guide wall 42 in the circumferential direction from an upper end portion to a part connected to the base portion 41. Therefore, the drawing-out groove portion 44 establishes communication between the inside and the outside of the accommodating portion 40 in the radial direction. The drawing-out groove portion 44 functions as a passage when the second bridging portion 63 drawn out from the wound portion 61 is drawn out to the outer side in the radial direction.

In the guide groove portion 43, a first guide groove portion 431, a second guide groove portion 432, and a third guide groove portion 433 are aligned in this order from the inner side to the outer side in the radial direction. The first guide groove portion 431 on the inner side in the radial direction is a guide groove portion 43 formed between the first guide wall 421 and the second guide wall 422. The second guide groove portion 432 at the center portion is a guide groove portion 43 formed between the second guide wall 422 and the third guide wall 423. The third guide groove portion 433 on the outer side in the radial direction is a guide groove portion 43 formed between the third guide wall 423 and the fourth guide wall 424.

In the present embodiment, a second bridging portion 63U of the coil conductor wire 60 in the U phase is inserted into the first guide groove portion 431 on the inner side in the radial direction. A second bridging portion 63V of the coil conductor wire 60 in the V phase is inserted into the second guide groove portion 432 at the center portion. A second bridging portion 63W of the coil conductor wire 60 in the W phase is inserted into the third guide groove portion 433 on the outer side in the radial direction. The second bridging portion 63 drawn out from the covering portion 33 and the second bridging portion 63 extending and coming from another winding wire block 80 are inserted into each guide groove portion 43. In the present embodiment, four second bridging portions 63 at maximum are inserted into each guide groove portion 43.

One or a plurality of, in this case, two routing passages 45 are formed by cutting off the guide wall 42 between the drawing-out groove portion 44 and the end portion of the accommodating portion 40 in the circumferential direction. In this case, the routing passages 45 are formed by cutting off the second guide wall 422, the third guide wall 423, and the fourth guide wall 424 except for the first guide wall 421 on the inner side in the radial direction from the upper end portions to parts connected to the base portion 41. Opening portions that establish communication between the inside and the outside of the accommodating portion 40 are formed by the routing passages 45. The routing passages 45 provide spaces for routing the second bridging portion 63 to enable a direction change when the second bridging portion 63 drawn out through the drawing-out groove portion 44 to the outer side in the radial direction is drawn out to one side in the circumferential direction through any of the guide groove portion 43 as illustrated in FIG. 8.

Each of the guide walls 421, 422, 423, and 424 is split into a plurality of pieces by the drawing-out groove portion 44 and the routing passage 45. The first guide wall 421 on the inner side in the radial direction is split into two pieces in the circumferential direction by the drawing-out groove portion 44. Each of the fourth guide wall 424 on the outer side in the radial direction and the second guide wall 422 and the third guide wall 423 at the intermediate parts is split into four pieces in the circumferential direction by the drawing-out groove portion 44 and the routing passage 45.

The base portion 41 has a rising portion 411. The rising portion 411 is formed by causing a part of the base portion 41 to rise in a direction away from the first insulator 31 in regard to the axial direction between the two routing passages 45 and 45. Therefore, parts of the second guide wall 422, the third guide wall 423, and the fourth guide wall 424 projecting from the rising portion 411, that is, the parts between the routing passages 45 and 45 have shorter length dimensions in the axial direction than parts projecting from places other than the rising portion 411, that is, parts outside the routing passages 45 and 45 in the circumferential direction.

The rising portion 411 is split into two pieces in the circumferential direction by the drawing-out groove portion 44. Also, the rising portion 411 has a depressed portion 412. The depressed portion 412 is formed by depressing the rising portion 411 from the side of the second surface 402 to the inner side in the circumferential direction. The position of a bottom portion of depression of the depressed portion 412 in the radial direction substantially coincides with the surface of the third guide wall 423 on the outer side in the radial direction. The depressed portion 412 functions as a passage of causing the second bridging portion 63 drawn out through the drawing-out groove portion 44 to the outside of the accommodating portion 40 in the radial direction to be turned by about 90° in the circumferential direction and guiding the second bridging portion 63 to the side of the guide groove portion 43 as illustrated in FIGS. 8 and 9.

FIG. 8 illustrates, by the dashed lines, a state where the winding termination side of the coil conductor wire 60 is drawn out to the accommodating portion 40 and the second bridging portion 63 is accommodated in the accommodating portion 40. Also, in this case, the second bridging portion 63 is drawn out through the drawing-out groove portion 44 to the outer side in the radial direction. The second bridging portion 63 that has been drawn out is routed on one side in the circumferential direction around the rising portion 411 at the depressed portion 412. The second bridging portion 63 that has reached the routing passage 45 is inserted into any of guide groove portions 43, namely the first guide groove portion 431, the second guide groove portion 432, or the third guide groove portion 433, in this case, the first guide groove portion 431. The second bridging portion 63 that has been drawn out from the guide groove portion 43 extends toward the accommodating portion 40 of the adjacent split core 16.

Note that a free end portion, that is, an end portion on the side away from the base portion 41 of each of the guide walls 421, 422, 423, and 424 is present substantially on one plane. In other words, the height dimension of the free end portion of each of the guide walls 421, 422, 423, and 424 from the base portion 41 in a case where the rising portion 411 is not taken into consideration is set to be substantially the same.

The accommodating portion 40 further has one or a plurality of hole portions 46 and one or a plurality of recessed portions 47 as illustrated in FIGS. 4, 5, and the like. Each of the hole portions 46 and the recessed portions 47 is provided in the first guide wall 421 on the inner side in the radial direction or the fourth guide wall 424 on the outer side in the radial direction. In the present embodiment, the one or plurality of hole portions 46 and the one or plurality of recessed portions 47 are provided in the first guide wall 421 on the inner side in the radial direction. In this case, two hole portions 46 are opening portions formed to penetrate through the first guide wall 421 in the thickness direction at a part of the first guide wall 421 on a side further outward in the circumferential direction than the drawing-out groove portion 44. The hole portions 46 are formed as long holes with long axes in the axial direction. The hole portions 46 establish communication between the inside and the outside of the accommodating portion 40. The hole portions 46 allow the regulating member 70 to be inserted thereinto and allow the regulating member 70 to be wound around the second bridging portion 63 in a state where the second bridging portion 63 is accommodated in the accommodating portion 40.

Figure 10:
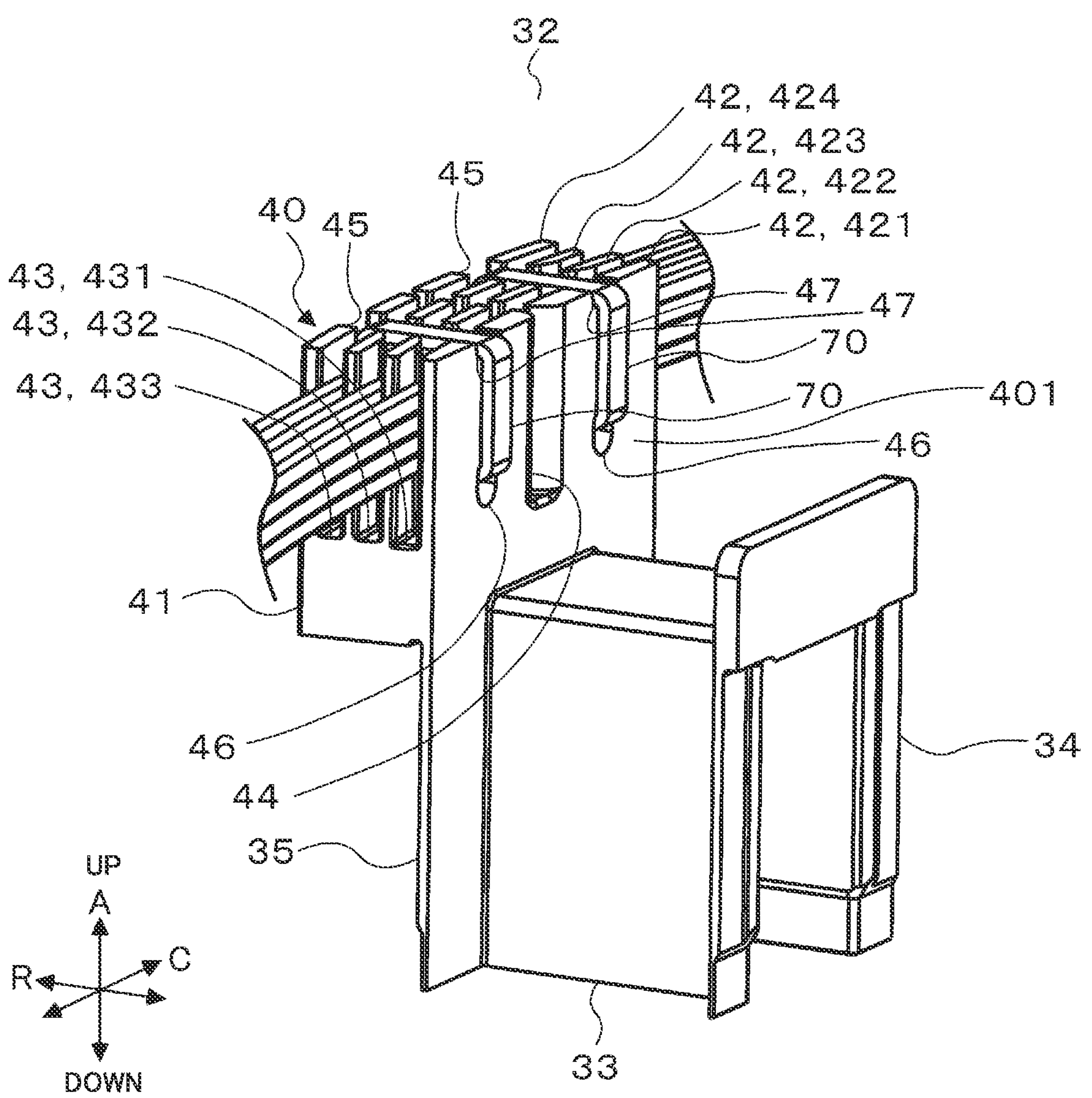
FIG. 10 is a perspective view of the example second insulator of the rotating electrical machine according to the first embodiment seen from the inner side in the radial direction in a state where the regulating member is wound around a bridging portion.
Figure 11:
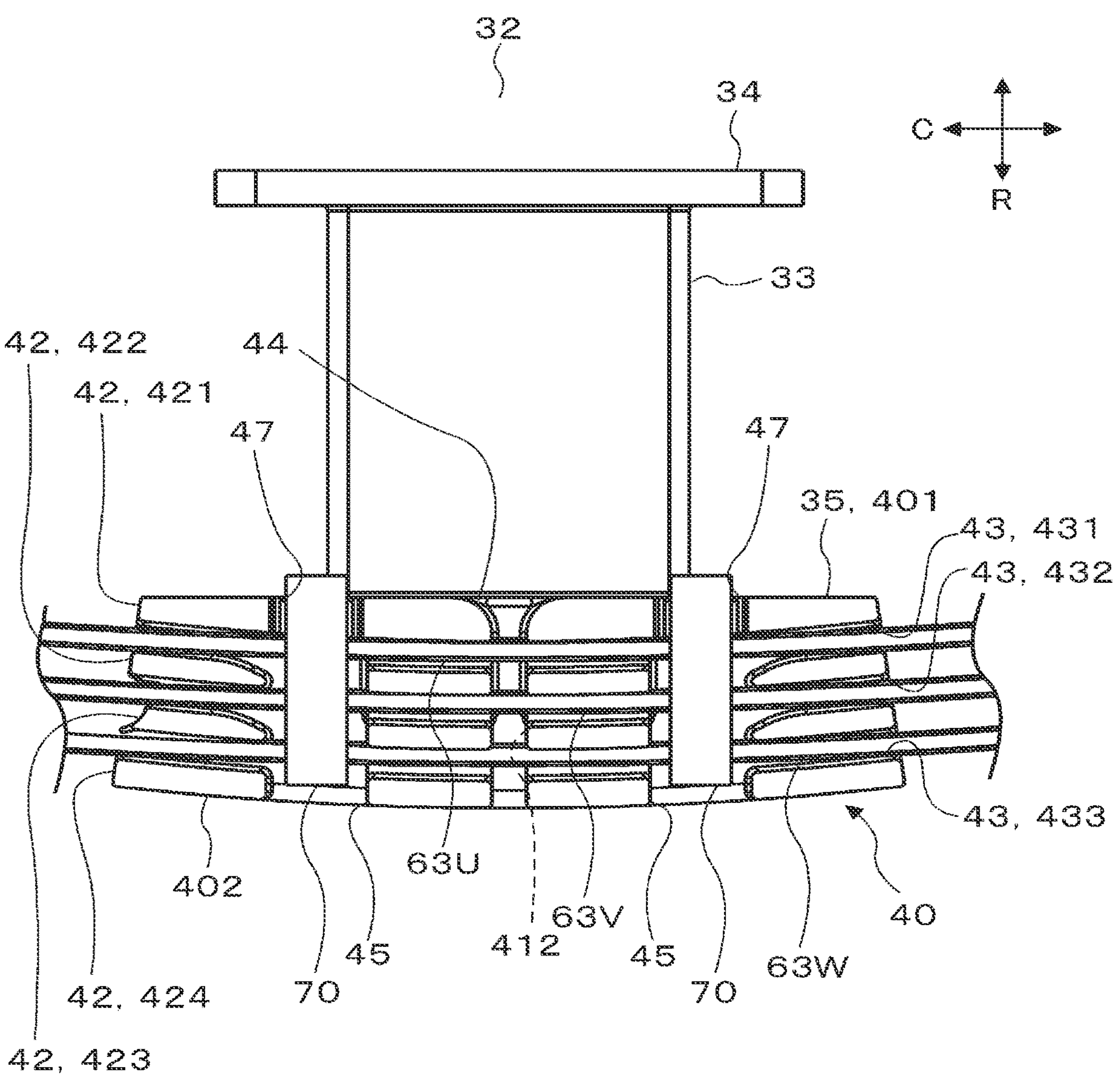
FIG. 11 is a view of the example second insulator of the rotating electrical machine according to the first embodiment seen from one side in the axial direction in the state where the regulating member is wound around the bridging portion.

The regulating member 70 is in a state where the regulating member 70 extends in a long axis direction, that is, in an open state before utilization and can be fixed in a closed state where the regulating member 70 is wound in an annular shape during utilization. The regulating member 70 regulates movement of a target in a state where the regulating member 70 is in contact with the target or has approached the target, by being fixed in a closed state where the surroundings of the target, movement of which is to be regulated, is wound in an annular shape as illustrated in FIGS. 9 to 11. The regulating member 70 can be formed of an insulating synthetic resin such as plastic, for example. Although examples of a method for fixing the regulating member 70 in the closed state in the annular shape include physical fixation based on engagement between parts of the regulating member 70, thermal welding, fixation using an adhesive, and the like, the method is not limited thereto. In the present embodiment, the regulating member 70 is simply fixed by physical fixation based on engagement between parts of the regulating member 70 in the closed state in the annular shape. In this case, a commercially available cable tie, for example, can be used as the regulating member 70.

As illustrated in FIGS. 6 and 7, the plurality of, in this case, two hole portions 46 are linearly symmetrically disposed with respect to the center of the accommodating portion 40 in the radial direction, in this case, the drawing-out groove portion 44. It is thus possible to fix the second bridging portion 63 with a satisfactory balance over the entire circumferential direction of the accommodating portion 40 when the second bridging portion 63 is fixed.

As illustrated in FIGS. 7, 9, and the like, the hole portions 46 are provided near the base portion 41 in regard to the axial direction of the first guide wall 421. In this case, the hole portions 46 are set to be closer to the base portion 41 than the midpoint of the first guide wall 421 in the axial direction, for example. In other words, the positions of lower end portions **46*a* of the hole portion 46, that is, end portions on the side of the base portion 41 or the side of the end portions connected to the first insulator 31 are set to be closer to the base portion 41 than the midpoint of the first guide wall 421 in the axial direction. Moreover, positions of upper end portions 46*b* of the hole portions 46, that is, end portions on the side opposite to the base portion 41 or the side opposite to the end portions connected to the first insulator 31 are set to be closer to the base portion 41 than the midpoint of the first guide wall 421** in the axial direction.

Also, the positions of the lower end portions **46*a* of the hole portions 46 are set at positions closer to the base portion 41 than the position of an upper end surface 412*a* of the depressed portion 412, that is, an end surface on the side opposite to the first insulator 31. The positions of the upper end portions 46*b* of the hole portions 46 are set at positions further away from the base portion 41 in regard to the axial direction than the position of the upper end surface 412*a* of the depressed portion 412. Moreover, the positions of the upper end portions 46*b* of the hole portions 46 are set at positions further away from the base portion 41 than the position of an upper end surface 411*a* of the rising portion 411, that is, the surface on the side away from the base portion 41** in regard to the axial direction.

In this case, the two recessed portions 47 are formed by cutting off, toward the base portion 41, parts of the free end portion of the first guide wall 421, that is, the end portion on the side away from the base portion 41 in regard to the axial direction and causing the parts to be recessed. The recessed portions 47 are provided in a region obtained by extending the hole portions 46 in the direction away from the base portion 41 in regard to the axial direction. In other words, when the regulating member 70 is wound around the second bridging portion 63, one end portion of the regulating member 70 inserted into the hole portions 46 passes through the outside of the recessed portions 47 in regard to the accommodating portion 40. The regulating member 70 fixes the second bridging portion 63 and the regulating member 70 itself to the accommodating portion 40 when the regulating member 70 is wound around the second bridging portion by passing through the inside in the radial direction of the first guide wall 421 on the inner side in the radial direction, that is, the outside of the first surface 401 in regard to the accommodating portion 40.

The width dimension of the recessed portions 47 in the circumferential direction is set to be equal to or greater than the width dimension of the regulating member 70. Preferably, the width dimension of the recessed portion 47 in the circumferential direction is set to be larger than the width dimension of the regulating member 70. Therefore, at least a part of the regulating member 70 is fitted into the recessed portions 47 when the regulating member 70 is inserted into the hole portions 46 and surrounds the second bridging portion 63. The recessed portions 47 regulate movement of the regulating member 70 in the circumferential direction in a state where the second bridging portion 63 is surrounded. Also, the width dimension of the recessed portions 47 in the circumferential direction is set to be equal to or less than 1.2 times, or preferably equal to or less than 1.1 times the width dimension of the regulating member 70, for example. In this manner, movement of the regulating member 70 in the circumferential direction is further regulated in the state where at least a part of the regulating member 70 is fitted into the recessed portions 47.

The depth dimension of the recessed portions 47 in the axial direction can be set to be equal to or greater than 25%, or preferably equal to or greater than 50% the width dimension of the regulating member 70, for example. In the present embodiment, the depth dimension of the recessed portions 47 in the axial direction is set to be equal to or greater than the width dimension of the regulating member 70. Therefore, projecting of the regulating member 70 to the outside of the accommodating portion 40 in the axial direction is curbed in the state where the regulating member 70 is fitted into the recessed portions 47 and is wound around the second bridging portion 63 as illustrated in FIGS. 9 to 11.

The hole portions 46 and the recessed portions 47 are provided on the extension line of the routing passage 45 in the radial direction. In other words, the hole portions 46 and the recessed portions 47 are provided at positions facing the opening portion in the fourth guide wall 424 on the outer side in the radial direction formed by the routing passage 45. Therefore, the regulating member 70 comes into contact with the second bridging portion 63 and regulates movement of the second bridging portion 63 outside the accommodating portion 40 in the radial direction, that is, on the side of the second surface 402 as illustrated in FIGS. 9 to 11 in the state where the regulating member 70 is wound around the second bridging portion 63.

The thus configured plurality of winding wire blocks 80 in the respective phases are continuously disposed in the circumferential direction in the order of the U phase, the V phase, and the W phase, for example. Each of the winding start end and the winding termination end of the coil conductor wire 60 drawn out from the covering portion 33 of the insulator 30 in each winding wire block 80 is connected. Although not illustrated in detail, the stator 10 is configured of three phases, namely the U phase, the V phase, and the W phase, and the coil conductor wire 60 is star-connected. As for the first bridging portion 62 on the winding start side of the coil conductor wire 60 drawn out from the side of the first insulator 31, first bridging portions 62 in the three phases are connected to each other as a neutral point. In this case, end portions of the first bridging portions 62 of the three adjacent winding wire blocks 80 are connected through pressurized electric thermal welding, for example. In the present embodiment, the number of welded locations is eight in the entire stator 10. The second bridging portions 63 on the winding termination side of the coil conductor wire 60 drawn out from the drawing-out groove portion 44 of the second insulator 32 are connected in the same phase and are connected to power supply terminals 90U, 90V, and 90W in the corresponding phases as illustrated in FIG. 1.

Figure 12:
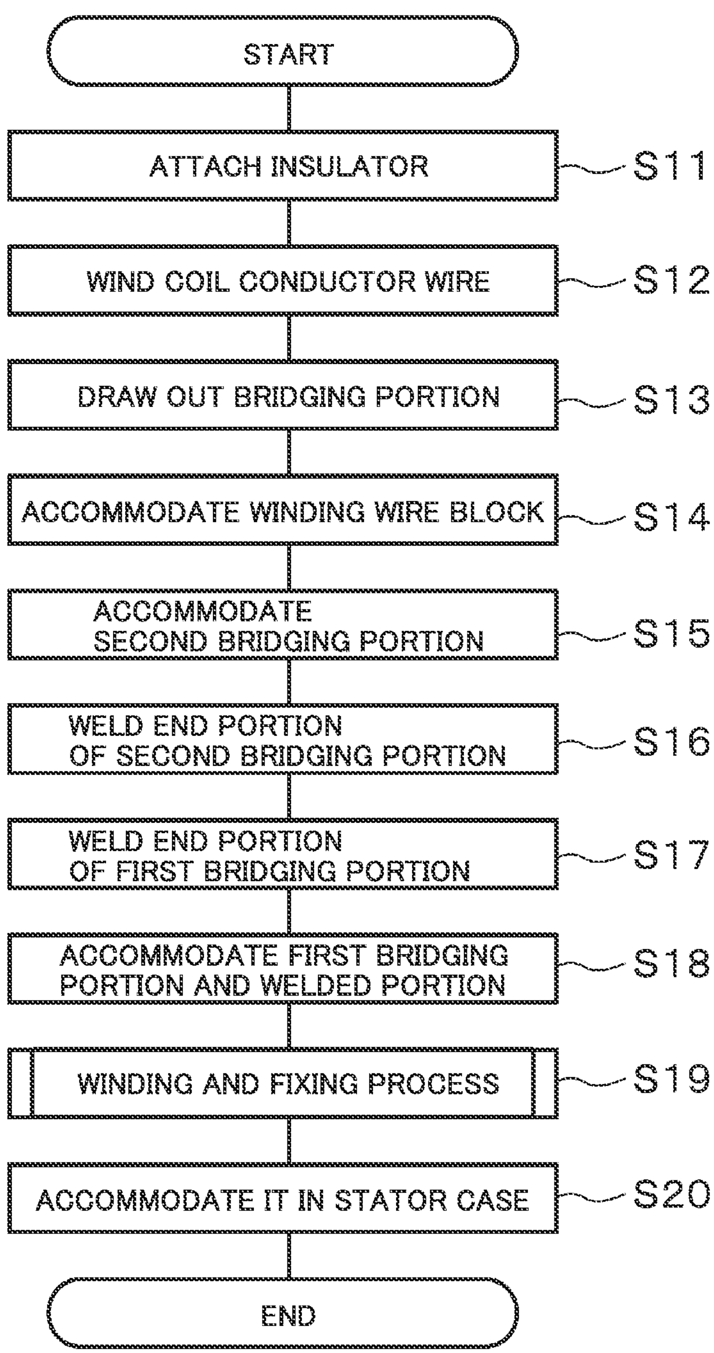
FIG. 12 is a flowchart representing a method for manufacturing an example stator of the rotating electrical machine according to the first embodiment.
Figure 13:
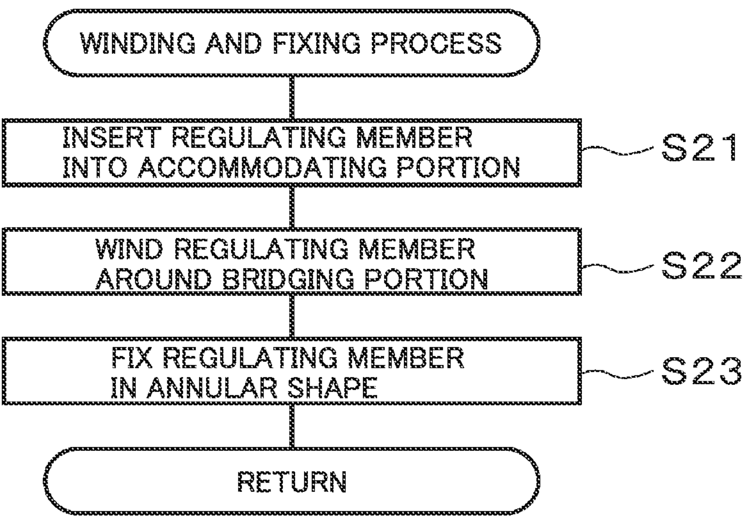
FIG. 13 is a flowchart representing a winding and fixing process in the method for manufacturing the example stator of the rotating electrical machine according to the first embodiment.

A procedure for manufacturing the stator 10 will be described with reference to FIGS. 12 and 13. Once manufacturing of the stator 10 is started (start in FIG. 12), the first insulator 31 and the second insulator 32 are attached to each split core 16 in Step S11. In Step S12, the wound portion 61 of the coil conductor wire 60 is wound around the tooth main body 19 of the split core 16 via the covering portion 33 of the insulator 30. In Step S13, a part of the coil conductor wire 60 on the winding termination side, that is, the second bridging portion 63 is drawn out from the drawing-out groove portion 44 of the second insulator 32 to the side of the accommodating portion 40. Note that a part of the coil conductor wire 60 on the winding start side, that is, the first bridging portion 62 is drawn out to the side of an accommodating portion 311 of the first insulator 31, details of which are not illustrated.

In Step S14, the plurality of winding wire blocks 80 with the coil conductor wire 60 wound around are accommodated in the ring member 15 through press-fitting. In this manner, the split cores 16 are disposed in an annular shape, and the stator core 14 is thereby formed. In Step S15, the second bridging portion 63 is routed through the routing passage 45 and is accommodated in the guide groove portion 43 of the accommodating portion 40. In Step S16, an end portion of the second bridging portion 63 is welded for each of the phases, namely the U phase, the V phase, and the W phase. In this case, the end portions of the eight second bridging portions 63 in each phase may be welded through pressure welding such as pressurized electric thermal welding in which the end portions are welded by heat generated by distributing power under a pressure or resistance welding, for example.

In Step S17, end portions of the first bridging portions 62 of the three adjacent winding wire blocks 80 are welded. In this manner, the coil conductor wires 60 on the side of the neutral point are connected. The end portions of the first bridging portions 62 may be welded by pressure welding such as pressurized electric thermal welding, resistance welding, or the like. In Step S18, the first bridging portion 62 including an unwelded part and a welded part is accommodated in the accommodating portion 311 on the side of the first insulator 31.

In Step S19, a winding and fixing process of the regulating member 70 is performed. Details of the winding and fixing process are shown in FIG. 13. In Step S21, the regulating member 70 is inserted into the accommodating portion 40. At this time, the regulating member 70 penetrate from the side of the first surface 401 to the side of the second surface 402 in the radial direction of the accommodating portion 40 through the hole portions 46 and the routing passage 45. In Step S22, the plurality of second bridging portions 63 accommodating in each accommodating portion 40 are wound together by the regulating member 70. In Step S23, the regulating member 70 is fixed in an annular state. In this manner, the second bridging portions 63 are fixed to the accommodating portion 40 by the regulating member 70 being wound around the second bridging portions 63. In this manner, the winding and fixing process of the regulating member 70 is performed. Returning to FIG. 12, the stator core 14 is accommodated in a stator case, details of which are not illustrated, in Step S20. Specifically, the ring member 15 inside which the plurality of winding wire blocks 80 are disposed and accommodated in an annular shape is press-fitted into the stator case. In this manner, the stator 10 is manufactured (end).

Furthermore, the thus manufactured stator 10 is combined with the rotor 11 and the like by any known method thereby to manufacture the rotating electrical machine 100.

Here, if the second bridging portions 63 of the coil conductor wire 60 sticks out from the accommodating portion 40, there is a concern that collapse of winding of the coil conductor wire 60 may occur. Although a method of fixing the second bridging portions 63 with a binding thread is also known, the binding thread itself may deviate in the circumferential direction or the like, and it is not possible to sufficiently prevent the second bridging portions 63 from sticking out.

On the other hand, according to the present embodiment described above, the stator 10 includes the winding wire blocks 80, the plurality of split cores 16, the insulator 30 including the first insulator 31 and the second insulator 32, the coil conductor wire 60, and the regulating member 70. The winding wire blocks 80 are disposed in an annular shape. The split cores 16 compose a part of the winding wire blocks 80 and are combined with each other to compose the stator core 14 in the annular shape. The insulator 30 composes a part of the winding wire blocks 80 and is attached to each of the plurality of split cores 16. The coil conductor wire 60 composes a part of the winding wire blocks 80 and has a wound portion 61 wound around each split core 16 via the insulator 30 and the first bridging portion 62 and the second bridging portion 63 drawn out from the wound portion 61. The regulating member 70 regulates movement of the coil conductor wire 60. The second insulator 32 has the accommodating portion 40 that accommodates the second bridging portion 63. The accommodating portion 40 has the first surface 401 and the second surface 402, and the hole portions 46 and the routing passages 45 as opening portions. The first surface 401 and the second surface 402 form surfaces facing each other. The hole portions 46 and the routing passages 45 are opening portions that communicate with each other and are formed in the first surface 401 and the second surface 402, respectively. The regulating member 70 is configured of a bendable member and is configured to be fixable in a state of an annular shape with the regulating member 70 inserted through the hole portions 46 that are opening portions in the first surface 401 and the routing passages 45 that are opening portions in the second surface 402. In other words, the regulating member 70 is configured to be fixable in a state where the regulating member 70 is wound around the second bridging portion 63 accommodated in the accommodating portion 40.

According to this, the regulating member 70 itself is also fixed to the accommodating portion 40 by being inserted through the hole portions 46, and movement of the regulating member 70 in the circumferential direction is regulated. Therefore, falling-off of the second bridging portion 63 is effectively curbed by the regulating member 70, and the stator 10 can reduce occurrence of short-circuiting or the like. Also, since it is only necessary to cause the regulating member 70 to be inserted through the hole portions 46 and the routing passages 45 and to fix the regulating member 70 in the annular shape, it is possible to considerably easily curb falling-off of the second bridging portion 63. Moreover, it is possible to use a member that can be easily obtained, such as a cable tie, for example, as the regulating member 70. Therefore, the stator 10 that enables the coil conductor wire 60 to be appropriately fixed by the simple method is provided.

Note that the stator 10 includes the stator core 14, the ring member 15, the plurality of split cores 16, the insulator 30 including the first insulator 31 and the second insulator 32, the coil conductor wire 60, and the regulating member 70. The stator core 14 is formed in an annular shape. The split cores 16 compose the stator core 14. The ring member 15 is formed in an annular shape and accommodates the plurality of split cores 16 therein in an aligned manner in an annular shape.

The accommodating portion 40 has the recessed portions 47 that receive the regulating member 70 at an end portion of at least one of the first surface 401 and the second surface 402. In the present embodiment, the recessed portions 47 are provided at a free end portion of the first surface 401.

Movement of the regulating member 70 itself in the circumferential direction is further curbed by the regulating member 70 being fitted into the recessed portion 47. Therefore, it is possible to curb loosening of the regulating member 70. Therefore, it is possible to further effectively curb falling-off of the second bridging portion 63 from the accommodating portion 40.

Here, if the number of slots in the stator 10 increases, the maximum number of second bridging portions 63 to be accommodated in the accommodating portion 40 increases. With this, it is not possible to accommodate the second bridging portions 63 in the accommodating portion 40 unless the volume of the accommodating portion 40 is sufficiently large, that is, unless the first surface 401 and the second surface 402 are sufficiently wide. In a case of a configuration in which the guide groove portions 43 are formed to be depressed in the radial direction of the stator 10, for example, there is a concern that the accommodating portion 40 excessively projects outward in the radial direction of the stator 10. In a case where the accommodating portion 40 largely projects on the side further outward than the back yoke portions 18 of the split cores 16 in the radial direction, the diameter of the rotating electrical machine 100 should increase. Furthermore, in such a case, there is a concern that the regulating member 70 may become interruption when the split cores 16 are press-fitted into the ring member 15 or the regulating member 70 may be damaged due to frictional heat generated at the time of the press-fitting.

On the other hand, the first surface 401 forms the surface of the accommodating portion 40 on the inner side in the radial direction of the stator core 14. The second surface 402 forms the surface of the accommodating portion 40 on the outer side in the radial direction of the stator core 14. The accommodating portion 40 has the first guide groove portion 431, the second guide groove portion 432, and the third guide groove portion 433 as the plurality of groove portions that are provided between the first surface 401 and the second surface 402, are formed by being depressed in the axial direction of the stator core 14, and accommodate the second bridging portions 63.

According to this, there is no need to cause the accommodating portion 40 to excessively project outward in the radial direction even of the number of slots increases, by forming the guide groove portions 43 to be depressed in the axial direction of the stator core 14, and it is thus possible to curb an increase in diameter of the rotating electrical machine 100. For this reason, it is possible to reduce interruption of the regulating member 70 and damage thereof due to frictional heat generated at the time of the press-fitting when the split cores 16 are press-fitted into the ring member 15. Therefore, the stator 10 that enables the coil conductor wire 60 to be appropriately fixed by the simple method is provided.

The hole portions 46 that are opening portions formed in the first surface 401 are through-holes formed to penetrate through the first surface 401 in the thickness direction. The recessed portions 47 are provided in a region obtained by extending the hole portions 46 in the axial direction.

According to this, the hole portions 46 and the recessed portions 47 are provided on a straight line that is parallel with the axial direction. Therefore, it is possible to minimize the length of the part of the regulating member 70 extending outside the first surface 401, that is, inside the accommodating portion 40 in the radial direction by the regulating member 70 passing through the hole portions 46 and the recessed portions 47. Accordingly, loosening of the regulating member 70 is unlikely to occur. Therefore, the stator 10 that enables the coil conductor wire 60 to be appropriately fixed by the simple method is provided.

Here, if the diameter or the width dimension of the coil conductor wire 60 differs, the dimension of the entire bridging portions accommodated in the accommodating portion 40 in the axial direction varies. For example, a case where the diameter or the width dimension of the coil conductor wire 60 is small and the dimension in the axial direction of all the plurality of second bridging portions 63 accommodated in the accommodating portion 40 is small will be examined. In this case, if the positions of the hole portions 46 are fixed, there is a concern that a large gap is placed between the regulating member 70 and the second bridging portions 63 even if the regulating member 70 inserted into the hole portions 46 is wound around the second bridging portions 63. Therefore, the sticking out of the second bridging portions 63 may not be able to be effectively curbed by the regulating member 70 depending on the diameter of the coil conductor wire 60.

On the other hand, in the present embodiment, the hole portions 46 that are opening portions in the first surface 401 are formed such that the length dimension in the axial direction of the stator core 14 is a long diameter while the length dimension in the circumferential direction is a short diameter. In the present embodiment, the hole portions 46 are long holes having a long diameter in the axial direction. In other embodiments, the hole portions 46 may have an oval shape having a long diameter in the axial direction or have a rectangular or a rounded rectangular shape having a long side in the axial direction, for example.

According to this, since the position of the regulating member 70 can move within a range of the long axis of the hole portions 46, the diameter of the annular shape formed when the regulating member 70 is wound around the second bridging portions 63 can be variable in accordance with the diameter or the width dimension of the coil conductor wire 60. Therefore, the stator 10 according to the present embodiment can curb a large gap placed between the regulating member 70 and the second bridging portions 63 and to effectively curb sticking-out of the second bridging portions 63 regardless of the diameter or the width dimension of the coil conductor wire 60. Also, the stator 10 according to the present embodiment can also address a change in thickness dimension of the regulating member 70. Therefore, the stator 10 that enables the coil conductor wire 60 to be appropriately fixed by the simple method is provided.

The stator core 14 has a plurality of, in this case, two regulating members 70 for each split core 16. The first surface 401 has the hole portions 46 as a plurality of, in this case, two opening portions disposed symmetrically from the center of the accommodating portion 40 in regard to the circumferential direction of the stator core 14.

According to this, it is possible to fix the second bridging portions 63 by the plurality of regulating members 70 with a satisfactory balance and thereby to more effectively prevent falling-off of the second bridging portions 63. Therefore, the stator 10 that enables the coil conductor wire 60 to be appropriately fixed by the simple method is provided.

The insulator 30 according to the present embodiment includes the accommodating portion 40 that accommodates the second bridging portions 63 of the coil conductor wire 60. The accommodating portion 40 has the first surface 401 and the second surface 402, the first guide groove portion 431, the second guide groove portion 432, and the third guide groove portion 433 as the plurality of groove portions, and the hole portions 46 and the routing passages 45 as the opening portions. The first surface 401 and the second surface 402 form mutually facing surfaces. The first guide groove portion 431, the second guide groove portion 432, and the third guide groove portion 433 are provided between the first surface 401 and the second surface 402, are depressed in the same direction, and accommodate the second bridging portions 63 in a separated manner for each phase. The hole portions 46 and the routing passages 45 are opening portions that communicate with each other and are formed to face the first surface 401 and the second surface 402.

According to this, the insulator 30 can fix the second bridging portions 63 at the accommodating portion 40 and regulate movement of the regulating member 70 in the circumferential direction by inserting the regulating member 70 such as a cable tie, for example, into the hole portions 46. Therefore, falling-off of the second bridging portions 63 is effectively curbed by using the regulating member 70, and the stator 10 can reduce occurrence of short-circuiting or the like. Additionally, since it is only necessary to cause the regulating member 70 to be inserted into the hole portions 46 and the routing passages 45 and to fix the regulating member 70 in the annular shape, the insulator 30 can considerably easily curb falling-off of the second bridging portions 63. Therefore, the insulator 30 that enables the coil conductor wire 60 to be appropriately fixed by the simple method is provided.

Furthermore, according to the present embodiment, the rotating electrical machine 100 includes the stator 10 or the stator 10 including the insulator 30, and the rotor 11. According to this, the rotating electrical machine 100 that enables the coil conductor wire 60 to be appropriately fixed by the simple method is provided as described above.

Other Embodiments

Note that the hole portions 46 are long holes in the above embodiment, the hole portions 46 are not limited thereto. For example, the hole portions 46 can be formed as long holes, ovals, long square holes, or the like in other embodiments. The aforementioned effects are achieved in these cases as well. Also, the hole portions 46 may have a circular shape, a rectangular shape, a rounded rectangular shape, a polygonal shape, or a rounded polygonal shape. Although a range in which a change in diameter of the coil conductor wire 60 can be addressed is narrowed in this case, the other effects described above can be achieved even in such embodiments.

Moreover, although the first surface 401 and the second surface 402 form the surface on the inner side in the radial direction and the surface on the outer side in the radial direction of the accommodating portion 40 in the aforementioned embodiment, the first surface 401 and the second surface 402 are not limited thereto. For example, the first surface 401 and the second surface 402 may be configured to form one surface in the axial direction and another surface in the axial direction of the accommodating portion 40. In this case, the first guide groove portion 431, the second guide groove portion 432, and the third guide groove portion 433 are formed to be depressed in the radial direction between the first surface 401 and the second surface 402. Although the diameter of the rotating electrical machine 100 may increase when the number of slots is caused to increase, for example, in such an embodiment, the other effects described above can be achieved.

Furthermore, although the aforementioned embodiment in which the regulating member 70 fixes the second bridging portions 63 accommodated in the accommodating portion 40 of the second insulator 32 has been described, the fixation is not limited thereto. For example, the first bridging portions 62 accommodated in the accommodating portion 311 of the first insulator 31 may be fixed with the regulating member 70. In this case, it is possible to provide opening portions that are formed in the surface on the inner side and the surface on the outer side of the accommodating portion 311 in the radial direction and communicate with each other although details are not illustrated. The regulating member 70 can be inserted into the opening portions formed in the surface on the inner side and the surface on the outer side in the radial direction and can be fixed in a state of the annular shape surrounding the first bridging portions 62. It is thus possible to regulate movement of the first bridging portions 62 accommodated in the accommodating portion 311. Also, it is possible to achieve the fixation with a satisfactory balance over the entire circumferential direction of the accommodating portion 311 when the regulating member 70 fixes the first bridging portions 62 by providing a plurality of opening portions linearly symmetrically from the center of the accommodating portion 311 in the circumferential direction at this time. Furthermore, it is possible to regulate movement of the regulating member 70 and to achieve further reliable fixation of the first bridging portions 62 by providing recessed portions for receiving the regulating member 70 at an end portion of at least one of the surface on the inner side and the surface on the outer side of the accommodating portion 311 in the radial direction.

Although the plurality of embodiments of the present invention have been described above, the embodiments have been proposed as examples and are not intended to limit the scope of the invention. These novel embodiments can be implemented in other various forms, and various omissions, replacements, and changes can be made without departing from the gist of the invention. These embodiments and modifications thereof are included in the scope and the gist of the invention and are also included in the inventions described in the claims and the scope equivalent thereto.

The invention claimed is:

1. A stator, comprising:

a plurality of winding wire blocks that are disposed in an annular shape;

a plurality of split cores that compose a part of the plurality of winding wire blocks and are combined with each other to compose a stator core with an annular shape;

an insulator that composes a part of the plurality of winding wire blocks and is attached to each of the plurality of split cores;

a coil conductor wire that composes a part of the plurality of winding wire blocks and has a wound portion wound around each of the plurality of split cores via the insulator and a bridging portion drawn out from the wound portion; and a regulating member that regulates movement of the coil conductor wire, wherein the insulator has an accommodating portion that accommodates the bridging portion, the accommodating portion includes a first surface and a second surface that form mutually facing surfaces, and opening portions that communicate with each other and are formed in each of the first surface and the second surface, the regulating member is configured of a bendable member and is configured to be fixable to the accommodating portion in a state of an annular shape wound around the bridging portion with the regulating member inserted through the opening portion formed in the first surface and the opening portion formed in the second surface, the accommodating portion has, at an end portion of at least one of the first surface and the second surface, a recessed portion that receives the regulating member, the opening portion formed in the first surface is a through-hole that is formed to penetrate through the first surface in a thickness direction, and the recessed portion is provided in a region obtained by extending the opening portion in the first surface in an axial direction of the stator core.

2. The stator according to claim 1, wherein the first surface forms a surface of the accommodating portion on an inner side in a radial direction of the stator core, while the second surface forms a surface of the accommodating portion on an outer side in the radial direction of the stator core, and the accommodating portion has a plurality of groove portions that are provided between the first surface and the second surface, are formed to be depressed in an axial direction of the stator core, and accommodate the bridging portion.

3. The stator according to claim 1, wherein the opening portion in the first surface is formed such that a length dimension in an axial direction of the stator core is a long diameter and a length dimension in a circumferential direction of the stator core is a short diameter.

4. The stator according to claim 1, comprising a plurality of the regulating members, wherein the first surface has a plurality of the opening portions disposed symmetrically from a center of the accommodating portion in regard to a circumferential direction of the stator core.

5. An insulator attached to each of a plurality of split cores that compose a part of the plurality of winding wire blocks and are combined with each other to compose a stator core with an annular shape, the insulator comprising an accommodating portion that accommodates a bridging portion of a coil conductor wire, wherein the accommodating portion has a first surface and a second surface that form mutually facing surfaces, a plurality of groove portions that are provided between the first surface and the second surface, are depressed in a same direction, and accommodate the bridging portion in a separated manner for each phase, and opening portions that communicate with each other and face each other and are formed in each of the first surface and the second surface, respectively, the accommodating portion has, at an end portion of at least one of the first surface and the second surface, a recessed portion that receives a regulating member, the regulating member being configured of a bendable member and configured to be fixable to the accommodating portion in a state of an annular shape wound around the bridging portion with the regulating member inserted through the opening portion formed in the first surface and the opening portion formed in the second surface, the opening portion formed in the first surface is a through-hole that is formed to penetrate through the first surface in a thickness direction, and the recessed portion is provided in a region obtained by extending the opening portion in the first surface in an axial direction of the stator core.

6. A rotating electrical machine comprising:

the stator according to claim 1; and a rotor.

7. A rotating electrical machine comprising:

the insulator according to claim 5; and a rotor.

* * * * *